April 19, 1966 A. I. STUBBS ET AL 3,246,795
CONTAINER FOR BREAD PRODUCTS OR THE LIKE
Filed Jan. 14, 1963
FIG. 1
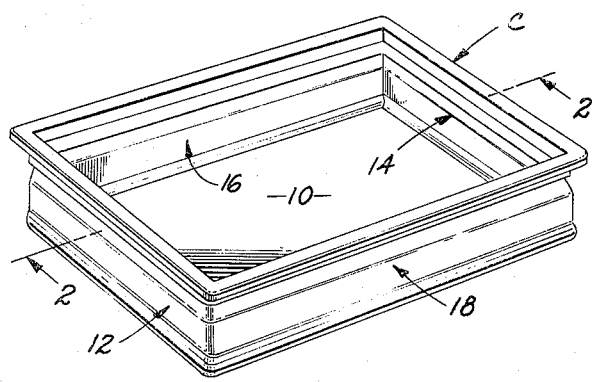
FIG. 2
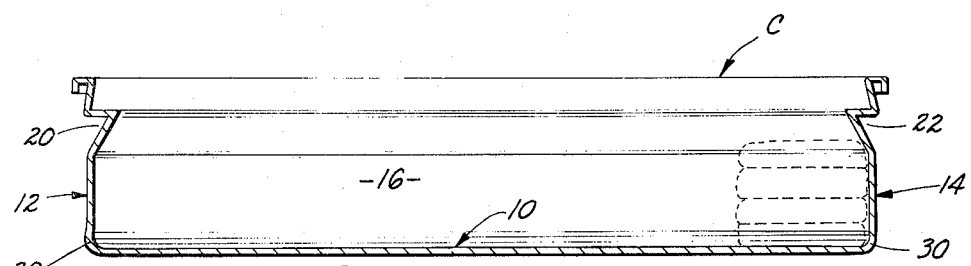
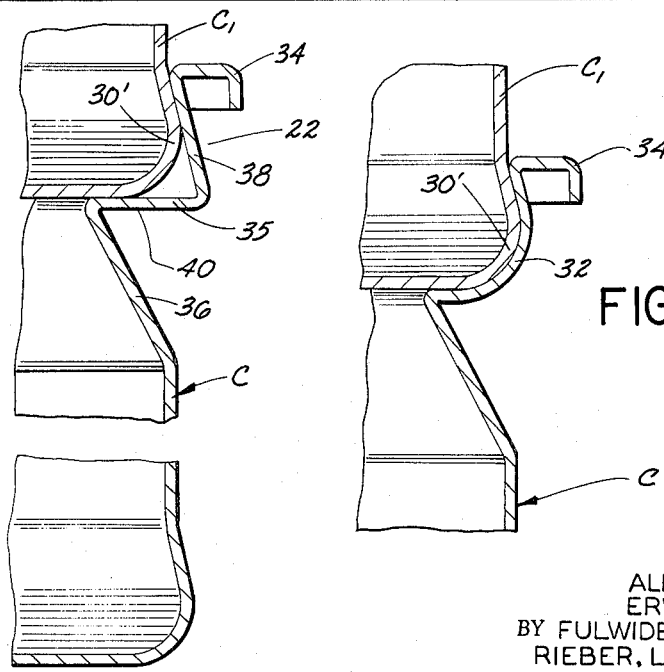
FIG. 4
FIG. 3
INVENTORS.
ALFRED I. STUBBS
ERWIN C. FABER
BY FULWIDER, PATTON,
RIEBER, LEE, & UTECHT
ATTORNEYS

United States Patent Office 3,246,795
Patented Apr. 19, 1966

3,246,795
CONTAINER FOR BREAD PRODUCTS OR THE LIKE
Alfred I. Stubbs, 1601 W. 14th St., and Edwin C. Faber, 4432 Blackthorne, both of Long Beach, Calif.
Filed Jan. 14, 1963, Ser. No. 251,128
6 Claims. (Cl. 220—97)

The present invention relates generally to containers of the type adapted to temporarily hold various products and more particularly to an open-topped container for transporting and storing bread products or the like.

Many bread products are normally transported and stored in cardboard or wooden open-topped containers. The cardboard containers are capable of being used only three or four times whereafter because of wear they must be replaced. Wooden containers afford a much longer service life, however, they must be frequently repainted and otherwise maintained. With either cardboard or wooden containers it is necessary to wrap the bread products in paper so as to restrain free communication between the bread products and the atmosphere, such free communication resulting in acceleration of the deterioration of the bread products.

It is necessary that the cardboard or wooden containers be manually transported from place to place. The present cardboard containers are normally not provided with handle means of any nature and accordingly their manipulation becomes awkward. The conventional wooden containers are formed with openings at either end to serve as handles. With this arrangement, the insertion of a workman's hands through these openings often results in contact with and damage to the bread products within the container.

It is a major object of the present invention to provide a container for bread products and the like which will eliminate the aforementioned disadvantages of the heretofore proposed cardboard and wooden containers used for this purpose.

It is another object of the present invention to provide a container of the aforedescribed nature having novel handle means which prevent contact of a workman's hands with the contents of the container.

A further object of the present invention is to provide a container of the aforedescribed nature which is adapted by its inherent sturdiness and simplicity of design to be made of any formable, shapeable or moldable material, including but not limited to thermo-setting polyester resin reinforced with fibre glass. This feature permits the container of the present invention to afford considerable savings in cost as compared to the heretofore proposed containers of this type.

A more particular object of the present invention is to provide a container which may be nested with other identical containers, with the nesting of a first container with a second container disposed therebelow automatically sealing the interior of the lower container against free communication with the atmosphere. This feature eliminates the necessity of wrapping the contents of the container in paper, as is the case with heretofore-proposed cardboard and wooden containers of this nature.

These and other objects and advantages of the present invention will become apparent from the following detailed description when taken in conjunction with the appended drawings wherein:

FIGURE 1 is a perspective view showing a preferred form of container embodying the present invention;

FIGURE 2 is a vertical sectional view in enlarged scale taken on line 2—2 of FIGURE 1;

FIGURE 3 is a vertical sectional view in further enlarged scale showing the container of FIGURES 1 and 2 nested with an identical container; and FIGURE 4 is a central, vertical sectional view taken in the same scale as FIGURE 3 and showing particularly a handle construction utilized with said containers.

Referring to the drawings and particularly FIGURES 1 and 2 thereof, a preferred form of container C embodying the present invention is of open-topped, generally rectangular configuration. Preferably, the container C is integrally formed of synthetic resin molded under heat and pressure, for example, a thermo-setting polyester resin reinforced with fibre glass mat. In forming the container C of this material, a sheet of the fibre glass mat may be placed in a mold shaped to correspond to the shape of the desired container. The resin mixture is then poured into the mold and the mold is closed whereafter heat is applied so as to cure the resin. This process is conventional and is well-known to those skilled in the art. It should be particularly understood however that the container C may be formed by other processes.

The container C includes a horizontally extending flat bottom 10 from which extend integral upstanding end walls 12 and 14. The opposite sides of the end walls are integral with the bottom 10 and are integrally joined with a pair of upstanding side walls 16 and 18. The vertical profile of the end and side walls are generally similar except for the provision of a pair of handles 20 and 22 disposed at the midportion of the end walls 12 and 14.

The end walls 12 and 14 and side walls 16 and 18 include at their lower portions with an outwardly curved convex tongue 30 while the upper portion of these end walls are provided with an outwardly curved concave groove 32. The upper end of the groove 32 merges into a reinforcing bead 34. The tongue 30 and groove 32 extend completely around the periphery of the upper portions of the end and side walls except in the region of the midportion of the end walls 12 and 14. Thus, as indicated particularly in FIGURES 2 and 4 there are formed a pair of handles 20 and 22 at the midportion of the end walls 12 and 14. These handles 20 and 22 are defined by means of a projection 35 of the groove 32 outwardly and horizontally from the upper portion of an upwardly and inwardly inclined section 36 of each of the end walls. The outer end of the horizontal projection 35 merges into an upwardly and inwardly extending wall section 38, with the underside of the projection 35 defining a shoulder 40 that may be engaged by the fingers of a workman. The width of the pockets 20 and 22 may slightly exceed the finger span of a human. The upper end of the wall section 38 is connected with the aforedescribed reinforcing bead 34.

As indicated particularly in FIGURES 3 and 4 the container C is adapted to be nested with a second container C' disposed thereabove. In order to effect such nesting the upper container C–1 is urged downwardly into the lower container C, the tongue 30' of the upper container C–1 entering the groove 32 of the lower container C. It is important that the configuration and dimensions of the tongue 30' and groove 32 be so chosen that the tongue 30' is releasably wedgable into the groove 32. This serves to temporarily lock the containers C and C–1 together and also to seal the interior of the lower container C against free communication with the atmosphere. The tightness of such seal should be sufficient that bread products disposed within the interior of the lower container C are protected against the rapid deterioration which would normally result if the interior of the container C were in free communication with the atmosphere. This feature eliminates the necessity of wrapping the bread products stored within the container C in paper, as is the case with the heretofore-proposed cardboard or wooden containers of this general nature.

With particular reference to FIGURE 3, it will be apparent that in order to effect the desired seal, the outermost point along the concave interior surface of the tongue 32 must be positioned inwardly of a similar point along the exterior surface of the tongue 30' when the groove 32 in its relaxed position, i.e. the position it normally assumes prior to the time that the tongue 30' has been wedged thereinto. The wedging of the tongue 30' within the groove 32 also serves to temporarily lock the upper container C–1 to the lower container C. This permits a plurality of the containers to be retained in a nested disposition without requiring exterior means for retaining the containers in such position.

It should be particularly noted that the use of a material such as fibre glass reinforced with resin permits the containers of the present invention to afford a long service life. Such material needs painting infrequently if at all, is easily washable and is extremely durable. Accordingly, although the initial cost of a container embodying the present invention will generally be higher than a cardboard or wooden container of the same size, the container of the present invention may be utilized many more times than a cardboard or wooden container and without requiring maintenance. For this reason the ultimate cost of using a container embodying the present invention will be considerably lower than where cardboard or wooden containers are used.

Various modifications and changes may be made with respect to the foregoing detailed description without departing from the spirit of the present invention or the scope of the following claims.

We claim:

1. An integral re-usable open-topped container for use with other identical containers which may be nested, said container being formed of a synthetic plastic resin reinforced with glass fibers, said container having a bottom from which extend upstanding side walls and end walls of generally similar profile, the lower portion of said walls being formed with an outwardly curved convex tongue and the upper portion of said walls being formed with an outwardly curved concave groove, the tongue of said container being downwardly releasably wedgable into the groove of an identical container disposed therebelow, with the lower surface of said tongue abutting the upwardly-facing surface of said groove to limit downward movement of said container into said identical container, and said groove temporarily flexing outwardly from its relaxed position to receive said tongue to temporarily lock the containers together in nested relationship and seal the interior of the lower container against free communication with the atmosphere.

2. A container as set forth in claim 1 wherein the upper periphery of said side and end walls are formed with an outwardly extending reinforcing bead.

3. A container as set forth in claim 1 wherein the midportion of said end walls are formed with handle means.

4. A container as set forth in claim 2 wherein the midportion of said end walls are formed with handle means.

5. An integral re-usable open-topped container for use with other identical containers which may be nested, said container being formed of a synthetic plastic resin reinforced with glass fibers, said container having a bottom from which extend upstanding side walls and end walls of generally similar profile, the lower portion of said walls being formed with an outwardly curved convex tongue and the upper portion of said walls being formed with an outwardly curved concave groove, the tongue of said container being downwardly releasably wedgable into the groove of an identical container disposed therebelow, with the lower surface of said tongue abutting the upwardly-facing surface of said groove to limit downward movement of said container into said identical container, said groove temporarily flexing outwardly from its relaxed position to receive said tongue to temporarily lock the containers together in nested relationship and seal the interior of the lower container against free communication with the atmosphere, and said groove at the mid-portion of said end walls being extended outwardly and horizontally to define handle means.

6. A container as set forth in claim 5 wherein the upper periphery of said side and end walls are formed with an outwardly extending reinforcing bead.

References Cited by the Examiner

UNITED STATES PATENTS

| 2,052,475 | 8/1936 | Jones | 220—97 |
| 2,447,022 | 8/1948 | McCarl | 220—97 |
| 3,070,275 | 12/1962 | Bostrom | 220—23 |

FOREIGN PATENTS

| 699,100 | 10/1953 | Great Britain. |
| 846,541 | 8/1960 | Great Britain. |

LOUIS G. MANCENE, *Primary Examiner.*

EARLE J. DRUMMOND, THERON E. CONDON,
*Examiners.*